(12) United States Patent
Flaishman

(10) Patent No.: US 7,818,915 B1
(45) Date of Patent: Oct. 26, 2010

(54) CULTURE OF EDIBLE FIGS

(75) Inventor: Moshe A. Flaishman, Bet-Dagan (IL)

(73) Assignee: The State of Israel, Ministry of Agriculture & Rural Development Agricultural Research Organization, Volcani Center (IL)

( * ) Notice: Subject to any disclaimer, the term of this patent is extended or adjusted under 35 U.S.C. 154(b) by 702 days.

(21) Appl. No.: 11/067,230

(22) Filed: Feb. 25, 2005

Related U.S. Application Data

(60) Provisional application No. 60/550,349, filed on Mar. 5, 2004.

(51) Int. Cl.
*A01G 17/00* (2006.01)
*A01G 17/02* (2006.01)
*A01G 17/04* (2006.01)
*A01G 17/06* (2006.01)

(52) U.S. Cl. .............. 47/58.1 FV; 47/1.43; 47/44; 47/46

(58) Field of Classification Search ............ 47/58.1 FV, 47/70, 1.43, 4, 44–47; A01G 17/00, 17/02, A01G 17/04, 17/06
See application file for complete search history.

(56) References Cited

U.S. PATENT DOCUMENTS

| | | | | |
|---|---|---|---|---|
| 4,068,404 A | * | 1/1978 | Sheldon | 47/22.1 |
| 4,291,526 A |   | 9/1981 | Hiyama et al. | |
| 4,333,266 A | * | 6/1982 | Babo | 47/58.1 R |
| 4,336,667 A | * | 6/1982 | Evans | 47/1.01 R |
| 4,543,775 A | * | 10/1985 | Horn et al. | 56/235 |
| 4,724,633 A | * | 2/1988 | Kadkade | 47/58.1 R |
| 4,896,453 A | * | 1/1990 | Jacob | 47/9 |
| 4,941,908 A | * | 7/1990 | Pharis et al. | 504/297 |
| 5,295,324 A |   | 3/1994 | Baba et al. | |
| 5,711,109 A | * | 1/1998 | Pitts | 47/58.1 R |

(Continued)

FOREIGN PATENT DOCUMENTS

JP      60190702 A   *   9/1985

(Continued)

OTHER PUBLICATIONS

AGFACTS, NSW Agriculture, Fig. Growing in NSW, 7 pages, Sep. 2002, www.agric.nsw.gov.au [retrieved from internet Oct. 3, 2008].*

(Continued)

*Primary Examiner*—Andrea M Valenti
(74) *Attorney, Agent, or Firm*—Venable LLP; Stefan J. Kirchanski

(57) ABSTRACT

The present invention is in the area of agriculture and more specifically is directed to a method for improving the culture of the edible fig (*Ficus carica*). As currently grown in California, the fig tends to have a rather short season so that fresh fruit is available only sporadically. The present invention provides a comprehensive method for improved culture of edible figs to provide fresh fruit throughout the year. The method specifies optimum methods for establishing and maintaining orchards. The method includes steps for extending fruit production into the winter. The method includes steps for enhancing fruit quality especially antioxidant compounds which are believed to be beneficial to human health. The method includes steps ensuring that fresh fruit will have an extended storage life. All of these factors contribute to higher yield and higher overall profitability.

20 Claims, 8 Drawing Sheets

U.S. PATENT DOCUMENTS

| | | | | |
|---|---|---|---|---|
| 6,036,104 A * | 3/2000 | Shih | ............................ | 239/63 |
| 6,309,440 B1 * | 10/2001 | Yamashita | ..................... | 71/27 |
| 6,374,538 B1 | 4/2002 | Morris et al. | | |
| 6,578,318 B1 * | 6/2003 | Clark | .................... | 47/58.1 FV |
| 6,668,485 B1 * | 12/2003 | Tivadar | ................... | 47/58.1 R |

FOREIGN PATENT DOCUMENTS

SU             1598885 A1 * 10/1990

OTHER PUBLICATIONS

Training and Pruning Tree Fruits, Fruit Culture of Alabama, ANR-53-K, Jul. 1999, 14 pages, by Arlie Powell et al.*

Training and Pruning Fruit Trees, Cooperative Extension University of California, Sacramento County, Environmental Horticultural Notes, 4 pages, Jan. 2000, by Ingels et al.*

Fruit trees, 3 pages, http://platnanswers.tamu.edu/fruit/fruits/.html [retrieved from internet Oct. 3, 2008] Feb. 27, 2001.*

Using Girdling to Improve Black Mission Fig Size, abstract, 1 page, by L. Ferguson et al, International Society for Horticultural Science http://www.actahort.org/members/showpdf?booknrarnr=605_25 [retrieve from internet Oct. 3, 2008] 2003.*

Pruning and Pinching by Brent Walston [retrieved from internet Apr. 9, 2009] Jan. 8, 2002, 3 pages.*

Love, Ken, "Fig growing and marketing in Japan," Mar. 2004, http://www.hawaiifruit.net/Figs-Japan.htm.

Love, Ken, Fig Photos, Mar. 2004, http://www.hawaiifruit.net/togofig/index.html http://www.hawaiifruit.net/hamafig/index.html http://www.hawaiifruit.net/aifarm/aifigfarm.html.

* cited by examiner

CULTURE OF EDIBLE FIGS

RELATED APPLICATIONS

The present application claims priority from U.S. Provisional Patent Application 60/550,349, filed Mar. 5, 2004. To the extent allowable, this application is hereby incorporated by reference.

BACKGROUND OF THE INVENTION

1. Area of the Art

The present invention is in the area of agriculture and more specifically is directed to a method for improving the culture of the edible common fig (*Ficus carica*)

2. Description of the Prior Art

Not unsurprisingly, culture and sale of fruits is of considerable economic importance. Traditional northern hemisphere fruits such as pears and apples have long been American staples. Today, more than ever, people recognize the truth in the old saying: "An apple a day keeps the doctor away." Increasingly, the public's taste is turning to what used to be considered "exotic" fruits. The trend probably started with the successful exploitation by New Zealand growers of the Chinese gooseberries (*Actinidia* sp.) after cleverly renaming them "Kiwi Fruit." Prior to the Kiwi success the most successful "exotic" fruit was probably the avocado (*Persea* sp.). Again, this success was probably helped by marketing under the Spanish name (avocado) as opposed to the less tasty sounding English name, "alligator pear."

One is increasingly seeing successful marketing of other "exotic" fruits such as the tamarillo (*Cyphomandra hartwegi*), and the African horned melon (*Cucumis metuliferus*) which definitely seems to sell better when named "Kiwano®." Along with this trend to popularize new fruits, several older "exotic" fruits are also becoming increasingly popular. Japanese persimmons (*Diospyros kaki*) are being seen more often in the autumn market as are pomegranates (*Punica granatum*) a plant from Asia Minor whose near-eastern history dates back to the chalcolithic period, some 6000 years ago.

The edible common fig (*Ficus carica*), another fruit of biblical and classical history, seems poised to make a comeback. Figs have long been valued in warm Mediterranean countries as a delicious fruit, available during the late summer (July-September). Although it can be grown as a curiosity in many of the southern states of the U.S., commercial culture seems feasible only in the western states of the U.S.—particularly in the warmer valleys of California. As currently grown in California, the fig tends to have a rather short season so that fresh fruit is available only sporadically. Despite considerable acreage devoted to figs in California, this fruit is largely known in the United States only in its dried form (today usually as the ubiquitous fig bar or fig cookie). Prior to the advent of the modern supermarket with year round fruits and vegetables, consumers expected and appreciated dried fruit. Most of the California fig crop was dried and additional substantial quantities of dried figs were imported. These days, dried fruit is generally not appreciated, and because fresh figs are soft and often do not ship well, many consumers have never even tasted one. This is unfortunate because the fruit is not only delicious but contains an unusually high level of antioxidant compounds which are believed to be beneficial to human health.

The fig is believed to be indigenous to western Asia and to have been distributed by man throughout the Mediterranean area. The fig tree has an unusual growth, bloom, and fruiting cycle. The tiny flowers of the fig are out of sight, clustered inside the green "fruits", technically a synconium. Pollinating insects gain access to the flowers through an opening at the distal end of the synconium. Unlike temperate trees that have a single blooming season and often produce buds for spring flowering, the summer or autumn before, the fig continually produces flower buds during the growth season. Under temperate growth conditions, the common fig produces a number of flower buds in autumn; these buds then over winter and produce a first spring fruit crop (called brebas or breba figs). In cold climates, the brebas crop is often destroyed by spring frosts. The brebas are borne on the previous year's or "old" wood. The second fruit crop or main crop is borne in the late summer and fall on growth produced during the current season.

In the case of modern varieties of the common fig, the flowers are all female and produce a fruit without a need for pollination (i.e., the flowers are parthenocarpic). There are three other fig types: 1) the caprifig which has both male and female flowers and requires pollination by a tiny wasp, *Blastophaga grossorum;* 2) the Smyrna fig, which does not produce viable pollen and requires cross-pollination by caprifigs to develop normal fruit; and 3) the San Pedro fig which is intermediate with its first crop independent of pollination like the common fig, and its second crop dependent on pollination.

Edible figs are produced on a deciduous tree that may range in height from 10 to 50 feet depending on pruning and growth conditions. Left to their own devices the plants often grow as a thicket with multiple trunks. However, the plant can be readily espaliered or otherwise trained although there appears to be many opinions about optimal shapes of the trained tree. The trees can withstand some cold weather but when exposed to prolonged freezing conditions, the trees die back to their roots. In optimal growing regions, with little or no exposure to freezing temperatures, the trees can become huge and shade out anything growing beneath them. It seems to be the general belief that pruning to control size must be done with care because it results in loss of fruit. It has been generally believed that heavy pruning is essential only during the initial years of tree growth.

It will be appreciated that the growth characteristics of the fig make it specially amenable to cultural manipulations. The marketing triumph of Chinese gooseberries mentioned above was the result of improved agricultural practices as well as marketing savvy. Significant agricultural improvements have been applied to many other fruits. With the current boom in wine production it is not surprising that considerable attention has been paid to the scientific cultivation of the grape vine. A good older example is found in U.S. Pat. No. 4,291,526 to Hiyama et al. which describes a mechanical harvesting system for the grape. U.S. Pat. No. 6,374,538 to Morris et al. describes a more modern method for mechanizing grape production. U.S. Pat. No. 6,578,318 to Clark, describes an improved method of grape culture including pruning and arrangement of the plant's canes.

Besides the methods described above for viticulture, a number of technologies can be used to improve the culture of other fruits. U.S. Pat. No. 4,336,667 to Evans discloses a pruning and training cultivation system applicable to a variety of fruit trees. U.S. Pat. No. 5,295,324 to Baba et al. discloses the use of a special plastic sheet mulching material to modify and control the growth and quality of fruits and vegetables including tree fruit.

SUMMARY OF THE INVENTION

In the United States and Europe, fig trees produce a maximum of around 7,000 pounds of fresh figs per acre with an average production of about two thirds that amount. Using our advanced methodology we are able to produce about two and one half times more than the current maximum production. Moreover using our advanced training systems we are able to produce figs almost year round and are able to control the time of fig production to fit market needs. Most fig production in the US is in late summer, using our methods we are able to produce figs in the early spring, fall and even during the winter time. Although the fig trees are deciduous, we found that growing the fig trees in net houses (i.e., under shade cloth) in areas where the lowest night temperature is about 4° C. will avoid leaf shed and enable continuous tree growth and fruit production.

The improved method of cultivation provides a significant improvement in production of the common edible fig. For optimum results the trees are planted at a much higher density of trees per acre than is usual. The trees are trained using a horizontal scaffold system. Alternatively, the plants can be renewed each year through drastic pruning in which case training can be essentially eliminated. In addition, the tree can be grown as an annual crop which is replanted each year. The growth as an annual crop growth is less sensitive to low temperature (winter conditions) and, therefore, this approach can be used to produce autumn and winter crops. During the growing season, irrigation and nitrogen fertilizer are applied in a balanced manner to maintain good growth while avoiding excessive vegetative growth.

When training is employed, a basic scaffold of horizontal branches is first established. After the basic scaffolds with permanent horizontal branches have been established correct pruning results in optimal results. During the late winter or early spring vertical shoots from the previous year's growth are shortened to stimulate vigorous new shoots that will bear the current year's second crop of fruit. Growth regulators are applied following pruning to accelerate bud break in the spring and to avoid abortion of the breba fruit buds. Pruning includes not only the typical winter-spring pruning of the previous year's growth, but also a "nipping" process applied one to several times during the growth season as well as a girdling process applied in special situations. Nipping crushes and removes the apical meristem from green, rapidly growing shoots (that have been stimulated by the earlier pruning) so that overly vigorous vegetative growth is prevented and nutrients and plant hormones are diverted into the developing fruit. These manipulations ensure that the breba figs develop quickly and are soon followed by fruit that matures during the normally barren mid-summer and is followed by an additional crop during the late summer to fall. Girdling can be used to stimulate bud break on horizontal branches.

Once fruit has developed it is harvested near maturity and early in the day. The harvested fruit is stored under controlled low temperatures, thereby ensuring a long shelf-life. Additional cultural steps can also be taken to improve fruit quality and extend the season still further. These steps include use of caprifigs for pollination and shade cloth for environmental amelioration.

DETAILED DESCRIPTION OF THE INVENTION

Figure 1:
FIG. 1 is a photograph, taken in July, of a typical fig tree that has not experienced leader pruning.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide improved culture of edible figs.

The present invention is a comprehensive method for improved culture of edible figs to provide fresh fruit essentially all year round. The method specifies optimum methods for establishing and maintaining orchards. The method includes steps for increasing fruit quality and ensuring that fresh fruit will have an extended storage life. All of these factors contribute to higher yield and higher overall profitability.

Fig Varieties and Orchard Density

The methods of the present invention can be applied successfully to different varieties of figs; however, each variety responds somewhat differently to each treatment. We found that the inventive treatments improve varieties belonging to the common fig (e.g., Brown Turkey and Mission) as well as to the San Pedro fig (e.g., Nazaret).

It has been found that optimum results are achieved with a much higher density of fig trees, per unit area planted, than is usual. Whereas common industry practice is to plant 150-300 trees per acre depending on variety and local growth conditions, the actual optimal density according to the invention is much higher than this. Optimum density with the present method is between about 600 and about 1,200 trees per acre.

It has been found that besides higher density of planting, superior results can be achieved using "berm planting." Berm planting means mechanically building a sort of a ridge by accumulating the top soil from the space between the rows of the trees into a "ridge" on top of which the trees will be planted. The height of the ridge is normally between about one and two feet depending on the heaviness of the soil with heavier soil requiring a higher ridge. The width of the top of the ridge is about 15 to 25 inches so that a truncated pyramidal ridge is formed. Alternatively the ridge can have a curved (convex) top with a top width of about 15 inches or more. Depending on the top width the bottom width of the ridge is normally between about two and three feet.

The top soil layer is considered to be the most fertile, so that by this practice we concentrate it in the root region. In addition we provide local drainage to the trees, so that the roots and the tree crown are elevated above any standing water from excessive rain or irrigation. The berms also provide earlier warming of the soil/roots in the spring and improved frost protection due to the higher relative elevation as cold air is more likely to flow down and off the elevated fig trees. When fig trees are grown on berms of the type just described, the trees produce superior brebas as well as "regular" new growth figs. Furthermore, because figs grow readily from cuttings, it is possible to build the berms in existing orchards by covering the crowns and the lower part of the trunks of existing trees. These will later initiate roots which grow into the berm.

Pruning and Training

Figure 2:
FIG. 2 is a photograph, taken in July, of a typical fig tree that has just been leader pruned.

Optimum results depend on pruning and training the trees. The fig is a strongly apically dominant plant so that pruning and other manipulations are required to stop the growth of leader shoots and promote the emergence of lateral branches that bear large amounts of fruit. It takes some 90-120 days between flower bud initiation and fruit maturity. Pruning and other manipulations can maximize the production of fruit buds and help in timing the production to market needs. It is important to prune the upwardly growing leader shoots at intervals of 3-4 months. That is, leader shoots are shortened to the level of two to five nodes during winter pruning and are then pruned again during the summer growth period. FIG. 1 shows a typical tree in mid July that has not had its leader shoots pruned. FIG. 2 shows a similar tree that had its shoots pruned at the beginning of August.

However, mere pruning of shoots is not always sufficient. Tests have demonstrated that winter pruning not only helps shape the tree, but can also stimulate the development of breba fruits. Particularly where vertical shoots show "blank" regions—that is, lengths of a vertical shoot where brebas should have developed, but failed to appear—dormant pruning to remove the top several nodes above the blank region causes brebas to develop in the blank region. During the growing season pruning can control the fruit production. It can enhance early maturation of the summer crop before mid to late summer when the market is often loaded with figs and the fig prices are low. In addition, this pruning can enhance the fall crop by removing the summer crop figs before they develop and by stimulating vigorous new growth that will bear the second crop of fruit. Such normal pruning is supplemented with nipping or pinching of the apical bud during the growth season. After winter pruning has forced the growth of new shoots, the apical buds of those new shoots are crushed or nipped when the shoot has attained a length of about 5-10 nodes.

Nipping or pinching differs from normal pruning as the operation involves the immature tissue of the shoot before significant secondary growth has commenced. As mentioned above, the shoots that were newly induced by pruning, rapidly set fruit buds. The nipping process diverts the plant's energy (i.e., sugars) and hormones into those fruit buds greatly accelerating their development and unexpectedly improving the quality of the resulting fruit. By the use of nipping, the mid-summer lull between the breba figs (fruit buds from the previous growth season) and the "second crop" figs (fruit buds from the current growth season) is reduced or eliminated, allowing production of high quality fruit at a time when fig trees undergoing cultivation by ordinary methods would have none. By providing fruit at a normal "off time", the method allows one to have fruit from spring through the summer into the autumn and even year round. Not only is the "rare" summer fruit of higher value, it is more likely to gain customer acceptance by having figs available essentially all year long.

Figure 3:
FIG. 3 is a photograph of a leader shoot that has been nipped showing the growth of a new leader shoot and fruit buds from axillary buds of the original shoat.

FIG. 3 shows how pruning of leader shoots causes buds to break with the generation of new rapidly growing shoots and with the formation of new fruit buds. Such a rapidly growing shoot will quickly generate new fruit buds, and such buds will be located closer to the ground allowing more convenient harvesting. The exact position of nipping can significantly influence the form of growth. If only the terminal bud is removed, it is likely that a single bud near the top of the nipped shoot tip will become activated and will replace the terminal bud. If the nipping removes the top 2-3 lateral buds as well as the terminal bud, then several lateral buds will become active and a multiple branching will occur. In addition, if the nipping takes place when the breba figs on that vertical are relatively mature, the nipping will accelerate maturity and ripening of the fruit by about one-two weeks, thereby providing earlier fruit.

Figure 4:
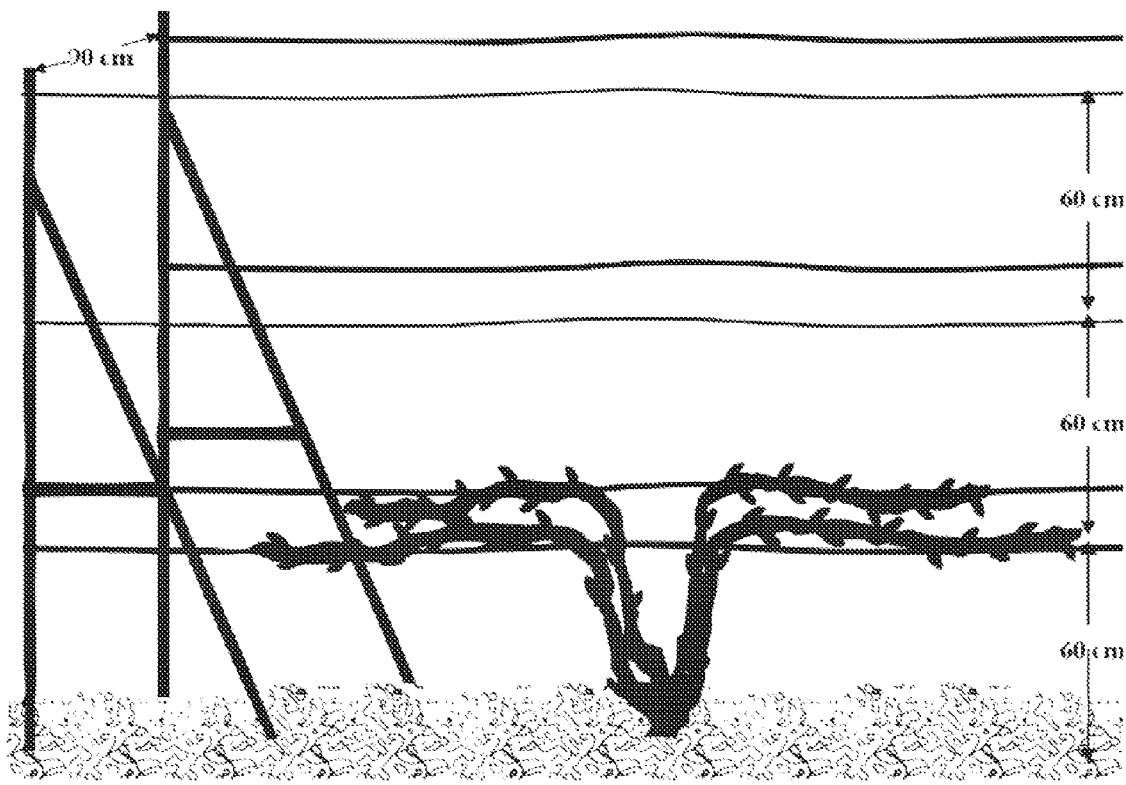
FIG. 4 is a diagram of a fig tree trained into four main branches according to the invention.
Figure 5:
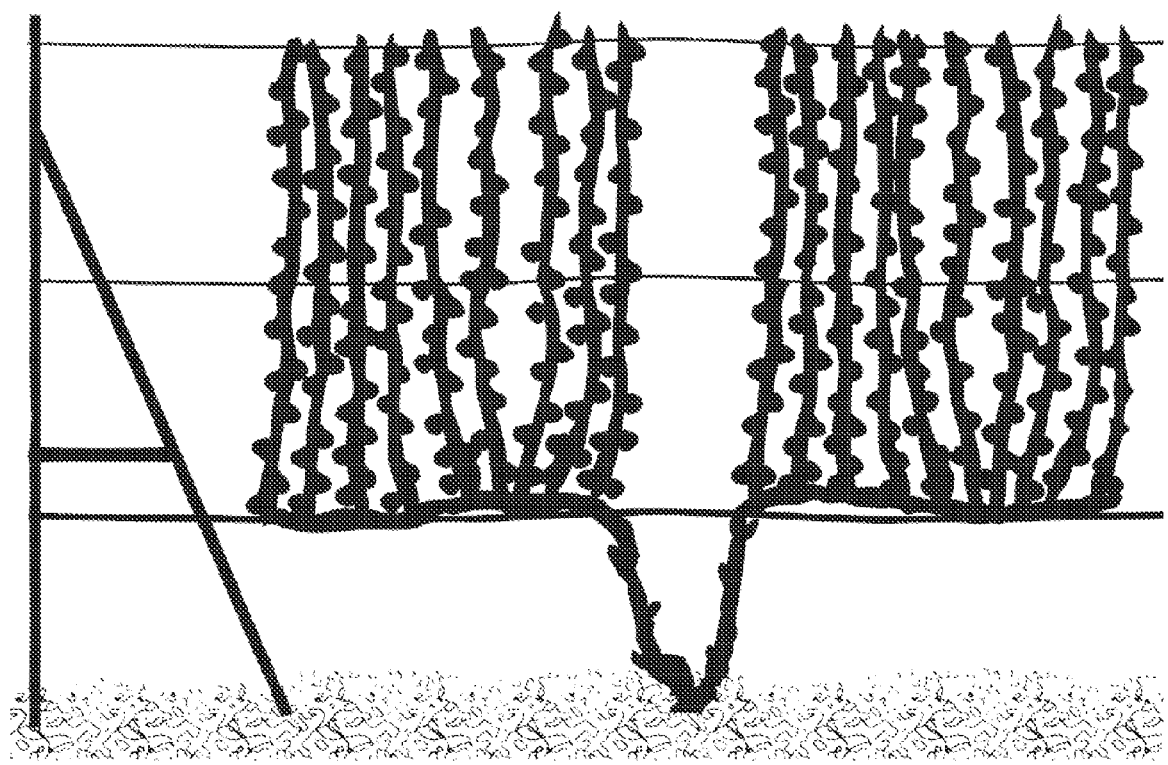
FIG. 5 is a diagram of the trained tree of FIG. 4 showing the production of fruit on vertical branches.
Figure 6A:
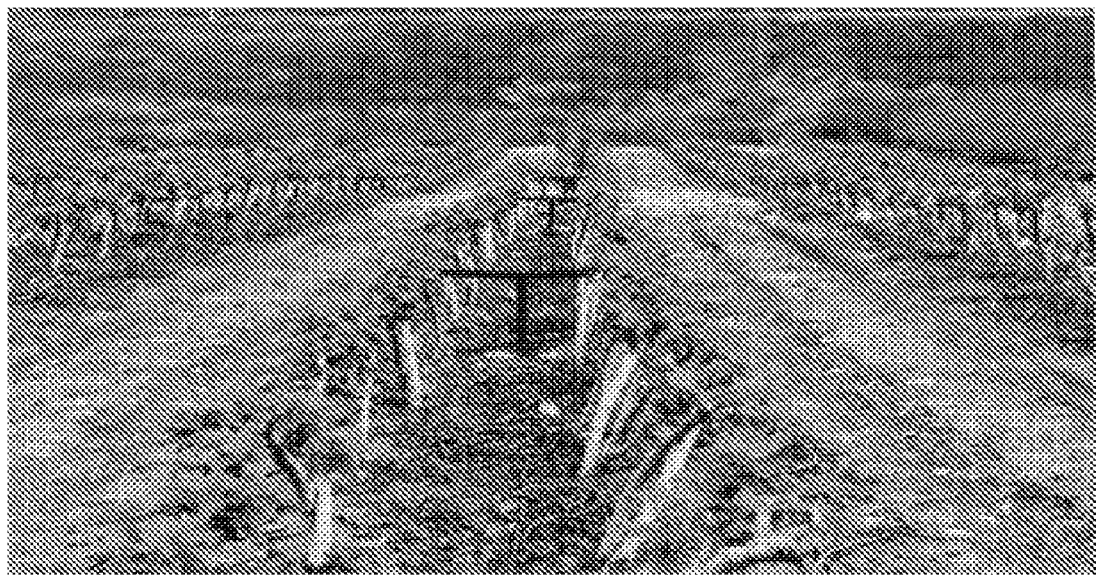
FIG. 6A is a photograph showing training of fig trees according to the present invention.
Figure 6B:
FIG. 6B is a photograph showing more details of training of fig trees according to the present invention.
Figure 7:
FIG. 7 is a photograph showing the trained trees in a stage of vigorous vegetative growth.
Figure 8:
FIG. 8 is a photograph of a trained tree showing fruit production (similar to the diagram of FIG. 5).

In the prior art, it was not uncommon to prune and train commercial fig trees to facilitate fruit picking. The present method introduces a more radical training, which facilitates not only the ease of fruit harvest but also the creation of an additional fruiting season. The use of nipping and other manipulations form part of the present invention. FIG. 4 shows a diagram of how a tree is pruned to a limited number (here four) horizontal main branches that are then trained on cordons or scaffolds. FIG. 6A is a photograph of young trees pruned in the manner of FIG. 4 during the first year of growth to form a scaffold system growing horizontally from a short vertical trunk. Each trunk produces four scaffold main branches as shown in FIG. 6B. In the second year of growth each scaffold branch will produce vertical branches shown in FIG. 7. The vertical branches then bear fruit. Fruit production is shown diagrammatically in FIG. 5 while a photograph of fruit production on a trained tree is shown in FIG. 8. The secondary vertical branches receive the nipping and other manipulations described herein.

It is also possible to attach horizontally oriented expanses of netting ("flower netting") to the trellises or other supports. When the growth is young and flexible, a vertical shoot can be bent under the netting to become a horizontal shoot for at least part of its distance. Then the growing tip of the shoot can be bent vertically through an opening in the netting to resume growth in the vertical direction. A second layer of netting spaced apart from the first layer may be used to stabilize such vertical growth. This approach can result in better placement and spacing of the vertical and horizontal shoots.

With the horizontal scaffolds established, subsequent pruning is aimed at producing a constant supply of young fruit bearing vertical branches. This practice increases the productivity (significant amounts of fruit are produced even in the first year) and simplifies orchard management and actually reduces maintenance pruning. It will be appreciated that the primary vertical branches should be evenly spaced along the horizontal branches. Pruning a vertical branch nearly to its base will cause the vertical branch to be replaced by new vertical shoots that arise from the base of the original vertical shoot. However, it is also important to control the spacing of the vertical shoots originating from a young horizontal scaffold. With the preferred planting density and scaffold system, each horizontal branch should support 7-10 vertical shoots.

This spacing can be achieved through girdling. If the horizontal branch is girdled, buds distal (in terms of the trunk) to the girdling will break and form vertical shoots. For this purpose the girdling should be only partial. That is, a band of bark and phloem tissue about 0.2-0.4 cm wide should be removed around about one half of the circumference of the branch. Properly performed such girdling will eventually heal without long-term damage to the branch. However, until the girdled area is healed, sugars and growth factors will accumulate on the distal side of the girdle, thereby stimulating dormant buds into vigorous growth.

Where growth conditions do not favor the earlier brebas crop of fruits, or when a conscious decision has been made to forgo the brebas crop, it is possible to grow the fig as a "pseudo annual." In this approach to cultivation the plant is pruned essentially to the ground each winter. This results in a rapid production of new, vigorous vertical shoots which are subsequently nipped and otherwise treated as already described. Because this "rejuvenation" process eliminates essentially all of last year's growth, there are no breba fruit produced. However, the vigorous vertical growth results in a superior second crop, often very late in the growing season. If the rejuvenation approach is adopted, it is advantageous to use a dense planting of the tree—as many as 1,000 trees per acre can be advantageously accommodated. Because the branches are pruned back each winter, very little if any training of the branches is employed.

To enhance winter production in colder conditions, the fig trees can be grown as an annual crop, each year the fig trees are replanted. Using this methodology we found that the young tree growth is less sensitive to cold winter conditions. The 8-10 month old trees can grow and produce figs in net houses (i.e., under shade cloth) when night temperatures are between 2-5° C. Under these temperatures older trees unprotected by netting will shed their leaves and will enter dormancy whereas young "annual" trees in net houses will not become dormant. This approach can be used to produce out of season autumn and winter fig crops, between November and May provided the local night time temperatures do not fall below freezing. The conventional fig growing methods that are used today in the US provide no fig production between January to May. If the replanting approach is adopted, it is advantageous to use an extremely dense planting of the trees and as many as 1,000-1,200 trees per acre can be advantageously accommodated.

Growth Management

The basic aspects of orchard layout and pruning have been covered above. In addition, there are a number of cultural steps that are taken during the growing season to maximize the quantity and quality of fruit produced. To ensure the earliest possible fruit production it is necessary to manage or manipulate dormancy of the trees. As already explained, the early fruit is breba fruit produced on fruit buds that were initiated during the previous growing season. The quicker such breba buds break dormancy in the spring, the earlier the first crop of fruit will ripen. The breba buds may wait until the season is somewhat advanced (i.e., warmer) before they start active growth. If the brebas are delayed, the tree may put much of its initial energy into vegetative growth upon breaking dormancy. The present invention employs plant growth regulators (PGR) and other means to control brebas bud break. Cyanamide salts such as calcium cyanamide are PGR's that are effective regulators of breba bud break. Applications of 1-5% cyanamide advances bud break by 14-20 days compared with non-treated trees. Applications of 1-5% cyanamide with ethylene (400 ppm) further advances bud break by 20-30 days as compared with non-treated trees. Because the time of spray application determines the time of bud break, spraying at the beginning of January was found to be a favorable time for application to ensure the earliest possible fruit. Of course, the optimal time for application will depend on the geographical latitude and the local climatic conditions. It is not a good idea to induce bud break until after danger of freezing temperatures has passed.

In addition to, or as a replacement for cyanamide treatment, GA (gibberellic acid or gibberrelin) can be applied to stimulate the breba fruit and temporarily slow vegetative growth of the terminal bud. Once a terminal bud begins active vegetative growth, it suppresses those breba fruits below it. However, if the plant is sprayed with gibberellins (for example, GA3 at a concentration of at least about 40-50 ppm) usually two times about one or two weeks apart, the brebas will be significantly stimulated. The optimal time for application is as soon as swelling of the terminal bud is detected and before rapid expansion of the terminal bud begins.

Application of cyanamide not only enhances breba bud break, but also enhances the overall tree growth and development, and therefore the production of the summer and fall fruit crops. By the use of cyanamide one can advance early summer crop production, as early as mid May until mid summer. This will also create enough time for the fall crop to mature and be harvested before winter. Of course, the development of the fruit crops will depend on the geographical latitude and the local climatic conditions.

To time the fig crop production to the market needs, in addition to cyanamide that enhance the whole tree production, ethylene can be applied to stimulate fruit ripening. Manipulating (increasing) the plant hormone ethylene accelerates the maturation of the fruit buds. Ethylene can be applied as a gas or in the form of PGR ethylene releasers such as ACC (1-aminocyclopropanecarboxylic acid), aviglycine, etacelasil, ethephon, glyoxime, etrel or other ethylene releasers known to those of skill in the art. Ethylene (at the range of 400-500 ppm) is used to enhance maturity of summer and fall fig crops.

Once growth has commenced in the spring, proper irrigation and fertilization are essential for maximizing the results of the various manipulations of the invention. It is important to achieve a balance between vegetative growth and fruit production. As explained above, somewhat vigorous vegetative growth is necessary to ensure a continued supply of fruit buds. Balanced irrigation with appropriate nitrogen fertilization is necessary to increase growth. However, it is important not to over accelerate vegetative growth as this can greatly diminish fruit production. Optimal irrigation/fertilization can be influenced by environmental conditions, the local soil structure and the precise fig varieties being grown. When all these factors are in a proper balance of vegetative growth/fruit production, the new shoots will continually produce new leaves and fig syconia (i.e., fruit "buds"). Excess nitrogen encourages vegetative growth at the expense of fruit production. In addition, with balanced irrigation/fertilization the fig tree will be directed into two growth waves: a first in spring between April to the end of May and a second growth wave between August and October. Overabundance of nitrogen fertilizer will accelerate vegetative growth over the entire season and retard development of the fruit buds. It is difficult or impossible to predict optimum fertilization and irrigation in advance. Rather, it is necessary to regularly observe the responses of the fig trees and modulate fertilizer application accordingly.

Excessive water or nitrogen will result in rank vegetative growth without production of fruit buds. Therefore, nitrogen application is decreased until excessive growth is controlled. The amount of nitrogen fertilizer so determined will then be appropriate for application in future seasons with the caveat that amounts may require some adjustment based on actual results. Adequate water is essential at the initiation of the growing season and at the middle of the growing season following the nipping procedure. However, irrigation should be decreased as the fruit approaches ripeness as excess water results in fruit cracking. In addition, nitrogen fertilizer can also increase fruit cracking. Therefore, such fertilizer should not be applied when the fruit is approaching maturity.

In particular, the quality (size, color and taste) of figs can be augmented by various cultural techniques. The vast majority of figs grown for fresh fruit are of the common fig type, which is parthenocarpic. That is, the fruit buds develop without pollination of the female flowers. Wild figs and certain cultivated figs require pollination for fruit production. We have found that providing pollen-laden caprifigs with their native pollinators significantly improves the quality of the summer figs in parthenocarpic varieties. As such, this pollination step is an additional part of the nipping, cyanamide and ethylene manipulation explained above. To enhance pollination, one can hang baskets of Blastophaga-infested caprifigs on the common fig type female trees so that the wasps can effectively pollinate the nascent fruit. Not only does the pollination improve the size and flavor of the fruits, the resulting fruits enjoy a shelf life that is at least one week longer than the untreated fruit. An additional cultural technique, the removal of the leaf subtending the maturing fruit, enhances color and taste and especially the antioxidant content of the fruit, which antioxidant is believed to be beneficial to human health.

Fresh figs have the reputation of being a difficult fruit to store, with an exceptionally short shelf life. Fruit quality is inferior if the fruit is picked too soon and it will have a very short shelf life if picked when overly mature. Despite the fact that optimal fruit picking can be influenced by environmental conditions, and may differ between varieties, we have discovered that if adequately ripe fruit is picked early in the day and then rapidly chilled to about 4° C. and held there, the fruit will have an extended shelf life that can range between 2-3 weeks. Inappropriate storage at higher temperatures such as 7-10° C. can reduce shelf life by about 50%. Thus, a seemingly subtle change can have a significant effect on shelf life. In addition, controlling respiration of the stored fruit is a key factor. Optimum results can be obtained by packaging the fruit in a nitrogen atmosphere sealed with differentially permeable plastic film. Such differentially permeable films are well known to those of skill in the art and allow carbon dioxide to diffuse out of the container without allowing oxygen to enter.

Other Cultivation Techniques

Figure 9:
FIG. 9 is a photograph shows the use of shade cloth according to the present invention.

Besides the numerous steps explained above, fig cultivation can also be enhanced by employing shade cloth (netting). Use of shade cloth is not unusual in propagation of cuttings, etc. of a variety of agricultural and horticultural plants. In addition, shade cloth is regularly used in the cultivation of plants that normally grow under the forest canopy and in other shade conditions. Since it is generally believed that optimal fig cultivation requires full sun, any use of shade cloth is rather counterintuitive. We found that fig growth under the shade cloth will moderate suboptimal environmental conditions such as excess wind, extreme heat and cold and will thus provide enhanced fig growth outside of the regular seasons and even allow production of figs in some areas during the winter. The shade cloth should be adjusted according to environmental conditions, but generally, the most efficacious results are obtained with a white or clear 25 mesh cloth placed approximately one to two meter above the trees as shown in FIG. 9.

In addition, plastic mulch can advantageously be applied to the soil surface to enhance the results obtained with the new method. Plastic sheeting is applied as mulch on either side of the fig trunks and extending 2-3 feet therefrom. The sheeting should be opaque to suppress the growth of weeds. Often, opacity is achieved by using black plastic. In cool areas the black mulch also results in an advantageous heating of the soil. However, in warm regions, the black sheeting may be formed with a white surface layer to reflect heat and avoid overheating of the soil (and roots). To take advantage of the long fruit seasons provided by the present inventive method it is important to grow the figs where the minimum temperatures will stay above 40° F. (5° C.) as long as possible. This indicates growing the figs in the desert regions of the western United States. In the desert drip irrigation is the most efficient means of providing the necessary water. If the drip irrigation tubes are placed underneath the plastic mulch they are protected from damage by animals, etc. What is more, the plastic mulch prevents evaporation of water so that virtually all of the applied water is absorbed by the roots as opposed to being lost to evaporation. An additional advantage is that irrigation of desert soils often leads to salination (salt build-up) of the soil since the added water penetrates the desert soil dissolving the salts therein. However, the amount of applied water is normally insufficient to flush away the salts; rather the water evaporates from the soil surface actually wicking salts up to accumulate in the root zone. Many plants, including figs are not salt tolerant so that accumulation of salts can be highly damaging. The plastic mulch prevents evaporation of water from the soil surface so that essentially no wicking occurs and salt does not accumulate in the root zone. The water stays at the root zone rather than being lost through evaporation, thereby reducing the amount of water that must be applied by as much as 20-30%.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just described preferred embodiment could be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

I claim:

1. A method for culture of edible fig plants to increase yield and to extend production season, the method comprising the steps of:

training the edible fig plants to produce horizontal scaffold branches;

developing vertical shoots on the horizontal scaffold branches;

pruning to shorten woody portions of the vertical shoots during dormancy of the edible fig plants; and preventing overly vigorous growth, altering fruit development and improving fruit quality of the edible fig plants by nipping rapidly growing vertical shoots at least once during each growing season to remove non-woody shoot portions including at least the terminal bud.

2. The method for culture of edible fig plants according to claim 1, wherein the step of developing vertical shoots further comprises a step of girdling the horizontal scaffold branches.

3. The method for culture of edible fig plants according to claim 1, wherein the step of pruning to shorten woody portions of the vertical shoots is also carried out during the growth season.

4. The method for culture of edible fig plants according to claim 1, wherein the step of nipping to shorten non-woody portions of the vertical shoots includes removal of nodes below the terminal bud.

5. The method for culture of edible fig plants according to claim 1 further comprising a step of manipulating bud break.

6. The method for culture of edible fig plants according to claim 5, wherein the step of manipulating bud break includes application of cyanamide before the beginning of the growing season.

7. The method for culture of edible fig plants according to claim 6, wherein the step of manipulating bud break includes altering ethylene levels.

8. The method for culture of edible fig plants according to claim 7, wherein ethylene levels are manipulated by applying ethylene or an ethylene releaser.

9. The method for culture of edible fig plants according to claim 8, wherein the ethylene releaser is selected from the group consisting of 1-aminocyclopropanecarboxylic acid, aviglycine, etacelasil, ethephon, glyoxime, and etrel.

10. The method for culture of edible fig plants according to claim 5, wherein the step of manipulating bud break includes application of gibberrelin.

11. The method for culture of edible fig plants according to claim 1 further including a step of providing pollination to parthenocarpic fig plants.

12. The method for culture of edible fig plants according to claim 1, wherein the edible fig plants are cultivated under shade cloth.

13. The method for culture of edible fig plants according to claim 1, wherein the edible fig plants are cultivated at a density greater than about 600 plants per acre.

14. The method for culture of edible fig plants according to claim 1 further comprising manipulating ethylene levels to alter fig fruit ripening.

15. The method for culture of edible fig plants according to claim 1, wherein the edible fig plants are cultivated on berms.

16. The method for culture of edible fig plants according to claim 1, wherein the edible fig plants are irrigated by drip irrigation.

17. The method for culture of edible fig plants according to claim 1, wherein cultivation of the edible fig plants includes use of water impermeable sheeting covering the soil between the edible fig plants.

18. The method for culture of edible fig plants according to claim 17, wherein the water impermeable sheeting is opaque.

19. The method for culture of edible fig plants according to claim 1, wherein the step of pruning to shorten woody portions of the vertical shoots removes a majority of wood produced during an immediately previous growing season, thereby rejuvenating the edible fig plants.

20. The method for culture of edible fig plants according to claim 1, wherein the step of training includes use of a trellis system.

* * * * *